United States Patent
Baladhandapani et al.

(10) Patent No.: US 12,518,641 B2
(45) Date of Patent: Jan. 6, 2026

(54) SYSTEMS AND METHODS FOR GENERATING AVIONIC DISPLAYS INDICATING WAKE TURBULENCE

(71) Applicant: HONEYWELL INTERNATIONAL INC., Charlotte, NC (US)

(72) Inventors: Gobinathan Baladhandapani, Madurai (IN); Gang He, Morris Plains, NJ (US); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 213 days.

(21) Appl. No.: 18/341,107

(22) Filed: Jun. 26, 2023

(65) Prior Publication Data
US 2024/0379015 A1 Nov. 14, 2024

(30) Foreign Application Priority Data
May 10, 2023 (IN) .............................. 202311033026

(51) Int. Cl.
*G08G 5/52* (2025.01)
*G01C 23/00* (2006.01)
(Continued)

(52) U.S. Cl.
CPC ................ *G08G 5/52* (2025.01); *G06T 11/00* (2013.01); *G08G 5/55* (2025.01)

(58) Field of Classification Search
CPC ............ G08G 5/52; G08G 5/55; G08G 5/723; G08G 5/76; G08G 5/21; G08G 5/25; G08G 5/26; G06T 11/00
See application file for complete search history.

(56) References Cited

U.S. PATENT DOCUMENTS 5,657,009 A 8/1997 Gordon
6,177,888 B1 1/2001 Cabot
(Continued)

FOREIGN PATENT DOCUMENTS

CN 106885916 A * 6/2017 .............. G01P 3/665
CN 110750564 A * 2/2020 ............. G06F 16/26
(Continued)

OTHER PUBLICATIONS

XP032186872; Clark Lunsford et al: "Exploring a flight deck based wake turbulence situational awareness tool", Integrated Communications, Navigation and Surveillance Conference (ICNS), 2012, IEEE, Apr. 24, 2012 (Apr. 24, 2012), pp. O3-1, DOI: 10.1109/ICNSURV.2012.6218435 ISBN: 978-1-4673-1901-0.

*Primary Examiner* — Said Broome
*Assistant Examiner* — Denis Vasiliy Minko
(74) *Attorney, Agent, or Firm* — Ingrassia Fisher & Lorenz LLP (57) ABSTRACT

Systems and methods are provided for indicating wake turbulence on an avionic display. The system comprises a display device that is onboard an aircraft and a controller in communication with the display device. The controller configured to, by a processor: receive data that includes information relating to a wake turbulence generated by another aircraft, determine a location on a runway of the wake turbulence based on the received data, and render a visual element on a display device onboard the aircraft that is in communication with the controller that is configured to display information relating the determined location on the runway of the wake turbulence, wherein the information is displayed in relation to a takeoff environment of the aircraft.

20 Claims, 7 Drawing Sheets

(51) Int. Cl.
  *G06T 11/00* (2006.01)
  *G08G 5/21* (2025.01)
  *G08G 5/25* (2025.01)
  *G08G 5/26* (2025.01)
  *G08G 5/54* (2025.01)
  *G08G 5/55* (2025.01)
  *G08G 5/76* (2025.01)

(56) References Cited

U.S. PATENT DOCUMENTS

| | | | |
|---|---|---|---|
| 6,424,408 B1 | 7/2002 | Ooga | |
| 6,703,945 B2 | 3/2004 | Kuntman et al. | |
| 7,333,030 B2 | 2/2008 | Baranov et al. | |
| 9,709,698 B2 | 7/2017 | Nykl et al. | |
| 9,911,342 B2 | 3/2018 | Herder | |
| 10,446,040 B2 | 10/2019 | Hosamani et al. | |
| 11,817,000 B2 * | 11/2023 | Singh | G08G 5/723 |
| 2002/0089432 A1 | 7/2002 | Staggs et al. | |
| 2003/0025714 A1 | 2/2003 | Ebersole et al. | |
| 2008/0030375 A1 | 2/2008 | Cotton et al. | |
| 2015/0088342 A1 | 3/2015 | Conner et al. | |
| 2020/0334994 A1 | 10/2020 | Jensen | |
| 2022/0223052 A1 | 7/2022 | Holmes et al. | |

FOREIGN PATENT DOCUMENTS

| | | | | |
|---|---|---|---|---|
| EP | 1197763 A2 | | 4/2002 | |
| FR | 3026533 A1 * | | 4/2016 | G08G 5/727 |
| GB | 2601144 A | | 5/2022 | |
| KR | 20180026241 A * | | 3/2018 | G01C 21/3638 |
| WO | 2009029005 A2 | | 3/2009 | |

* cited by examiner

SYSTEMS AND METHODS FOR GENERATING AVIONIC DISPLAYS INDICATING WAKE TURBULENCE

CROSS REFERENCE TO RELATED APPLICATION

This application claims priority to India Provisional Patent Application No. 202311033026, filed May 10, 2023, the entire content of which is incorporated by reference herein.

TECHNICAL FIELD

The present invention generally relates to aircraft departure and landing, and more particularly relates to systems for indicating a wake turbulence on an avionic display of an aircraft.

BACKGROUND

Wake turbulence (also referred to simply as "wake") is an atmospheric disturbance that forms behind an aircraft (referred to as the generating aircraft) that is a function of the aircraft producing lift, resulting in the formation of two counter-rotating vortices trailing behind the aircraft. Wake turbulence from a generating aircraft can affect other aircraft following the generating aircraft (referred to as the trailing aircraft) based on the strength, duration, and direction of the vortices. For example, wake turbulence can impose rolling moments exceeding a roll-control authority of the trailing aircraft, causing possible injury to occupants and damage to the trailing aircraft. This is not only a concern during flight, but also during departure and landing.

The wake turbulence produced by a generating aircraft depends on the weight, speed, and wingspan of the generating aircraft. For example, the strength of wake turbulence created by a Boeing 747® (commercially available from the Boeing Company) is higher than that of an Airbus A320® (commercially available from the Daimler-Benz Aerospace Airbus GMBH Corporation). Since the wake turbulence is generated behind the generating aircraft, it becomes a hazard for other aircraft that are following the generating aircraft unless a recommended amount of separation is maintained therebetween. Depending on the situation, it can be either the flight crew's or the air traffic controller's responsibility to provide sufficient separation between two aircraft to avoid a wake turbulence encounter, that is, an event in which the wake turbulence of a generating aircraft impacts a trailing aircraft.

When providing clearance during landing/takeoff, the air traffic controller typically considers a generating aircraft's size and takeoff position (i.e., takeoff point or rolling point) or touchdown position as compared to a trailing aircraft's size, starting position, predicted distance necessary for takeoff (i.e., roll-off distance or takeoff roll), or predicted deceleration distance upon touchdown to ensure adequate distance is provided between the aircraft to avoid the wake turbulence. However, this consideration may not always be accurate. Specifically, wake turbulence is dynamic and dissipates over time based on various factors, the weight of aircraft varies depending on cargo stored therein, and wake turbulence may be produced on adjacent runways which may affect the trailing aircraft. As such, it can be difficult for the air traffic controller to provide a departure clearance that is free of wake turbulence.

Hence, there is a need for a system and/or a method capable of providing information relating to wake turbulence of other aircraft to an ownship so that a crew thereof can reduce the likelihood of the ownship being threatened by the wake turbulence.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for indicating wake turbulences on an avionic display. The system comprises a display device that is onboard an aircraft and a controller in communication with the display device. The controller configured to, by a processor: receive data that includes information relating to a wake turbulence generated by another aircraft, determine a location on a runway of the wake turbulence based on the received data, and render a visual element on a display device onboard the aircraft that is in communication with the controller that is configured to display information relating the determined location on the runway of the wake turbulence, wherein the information is displayed in relation to a takeoff environment of the aircraft.

A method is provided for indicating wake turbulence on an avionic display. The method comprises, with a processor of a controller of an aircraft: receiving data that includes information relating to a wake turbulence generated by another aircraft, determining a location on a runway of the wake turbulence based on the received data, and rendering a visual element on a display device that is onboard the aircraft that is in communication with the controller that is configured to display information relating the determined location on the runway of the wake turbulence, wherein the information is displayed in relation to a takeoff environment of the aircraft.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. As further appearing herein, the term "pilot" encompasses all users of the below-described aircraft system.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein allow for providing information to an ownship relating to wake turbulence generated by other aircraft. In particular, the systems are configured to display one or more visual elements on an avionic display of the ownship that may each relate to a location of a wake turbulence. In some embodiments, the visual element indicates additional information such as, but not limited to, an intensity of the wake turbulence, a maximum speed, speed constraint (e.g., maximum speed minus a factor of safety), or target safe rate of travel for the ownship due to the wake turbulence, warnings relating to the wake turbulence, and the like. The systems and methods allow a crew of the ownship to monitor relevant wake turbulence(s) quickly and conveniently and thereby reduce the likelihood of the ownship being threatened by the wake turbulence(s), especially during takeoff, landing, and/or approach of the ownship. In various embodiments, the information relating to the wake turbulence is displayed in relation to a takeoff or landing environment of the ownship. As used herein, the phrase "takeoff or landing environment of the ownship" refers to the circumstances, objects, and/or conditions by which the ownship is surrounded. As nonlimiting examples, the takeoff or landing environment may include the operating conditions of the ownship (e.g., speed, direction, position, etc.) relative to the conditions of the wake turbulence (e.g., location, intensity, etc.) and, optionally, may include other affecting conditions such as weather (e.g., wind direction and speed).

Figure 1:
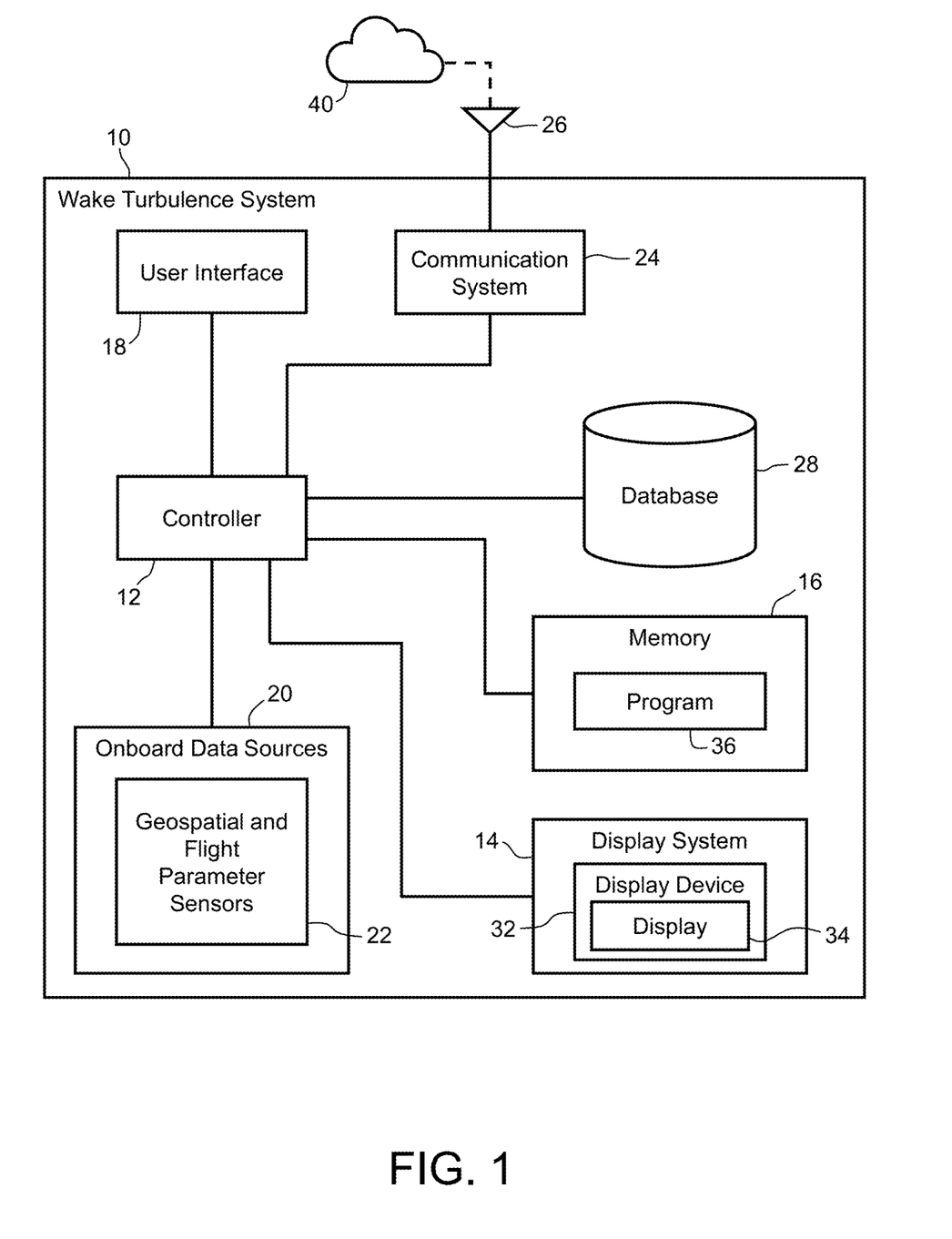
FIG. 1 is a schematic block diagram of an aircraft system including a system for wake turbulence notification in accordance with various embodiments.

FIG. 1 is a block diagram of a wake turbulence system 10, as illustrated in accordance with an exemplary and non-limiting embodiment of the present disclosure. The wake turbulence system 10 may be utilized onboard a mobile platform to provide wake turbulence awareness, as described herein. In various embodiments, the mobile platform is an aircraft, which carries or is equipped with the wake turbulence system 10. As schematically depicted in FIG. 1, the wake turbulence system 10 (shortened herein to the system 10) includes the following components or subsystems, each of which may assume the form of a single device or multiple interconnected devices including, but not limited to, a controller 12 operationally coupled to: at least one display device 32, which may optionally be part of a larger on-board display system 14; computer-readable storage media or memory 16; an optional input interface 18, and ownship data sources 20 including, for example, an array of flight system status and geospatial sensors 22. The system 10 may be separate from or integrated within a flight management system (FMS) and/or a flight control system (FCS). The system 10 may also contain a communication system 24 including an antenna 26, which may wirelessly transmit data to and receive data from various sources external to system 10, such as a cloud-based weather (WX) forecasting service.

Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the aircraft.

The term "controller," as appearing herein, broadly encompasses those components utilized to carry-out or otherwise support the processing functionalities of the system 10. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the ownship. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the ownship can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies a wake turbulence algorithm, to thereby perform the various process steps, tasks, calculations, and control/display functions described herein.

The controller 12 may exchange data with one or more external sources 40 to support operation of the system 10 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 can encompass any number and type of storage media suitable for storing computer-readable code or instructions, such as the aforementioned software program 36, as well as other data generally supporting the operation of the system 10. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for determining a wake turbulence of a generating aircraft (e.g., aircraft specifications, aircraft size categories, etc.) and/or airport runway map data may be part of the system 10. In certain embodiments, the source is one or more databases 28 employed to receive and store aircraft-related data and/or airport runway map data, which may be updated on a periodic or iterative basis to ensure data timeliness. In various embodiments, various aircraft specifications, aircraft categories, and/or airport runway map data may be stored in the memory 16 or in the one or more databases 28, and referenced by the program 36. In various embodiments, these databases 28 may be available online and accessible remotely by a suitable wireless communication system, such as the communication system 24.

The sensors 22 supply various types of data and/or measurements to the controller 12. In various embodiments, the sensors 22 supply, without limitation, one or more of: inertial reference system measurements providing a location, Flight Path Angle (FPA) measurements, airspeed data, groundspeed data, vertical speed data, vertical acceleration data, altitude data, attitude data including pitch data and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 10, the controller 12 and the other components of the system 10 may be included within or cooperate with any number and type of systems commonly deployed onboard aircraft including, for example, a FMS, an Attitude Heading Reference System (AHRS), an Instrument Landing System (ILS), and/or an Inertial Reference System (IRS).

With continued reference to FIG. 1, the display device 32 can include any number and type of image generating devices on which one or more avionic displays may be produced. In various embodiments, the display device 32 may be affixed to the static structure of the ownship cockpit as, for example, a Head Down Display (HDD) or Head Up Display (HUD) unit. Alternatively, display device 32 may assume the form of a movable display device (e.g., a pilot-worn display device) or a portable display device, such as an Electronic Flight Bag (EFB), a laptop, or a tablet computer carried into the ownship cockpit by a pilot.

At least one avionic display 34 is generated on display device 32 during operation of the system 10. The term "avionic display" as used herein is synonymous with the terms "aircraft-related display" and "cockpit display" and encompasses displays generated in textual, graphical, cartographical, and other formats. The system 10 can generate various types of lateral and vertical avionic displays 34 on which symbology, text annunciations, and other graphics pertaining to flight planning are presented for a pilot to view. The display device 32 is configured to continuously render at least one avionic display 34 showing at least one wake turbulence at a current location thereof in relation to a takeoff environment of the ownship. The avionic display 34 generated and controlled by the system 10 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such a touch screen display, is implemented as an integration of the pilot input interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

Figure 2:
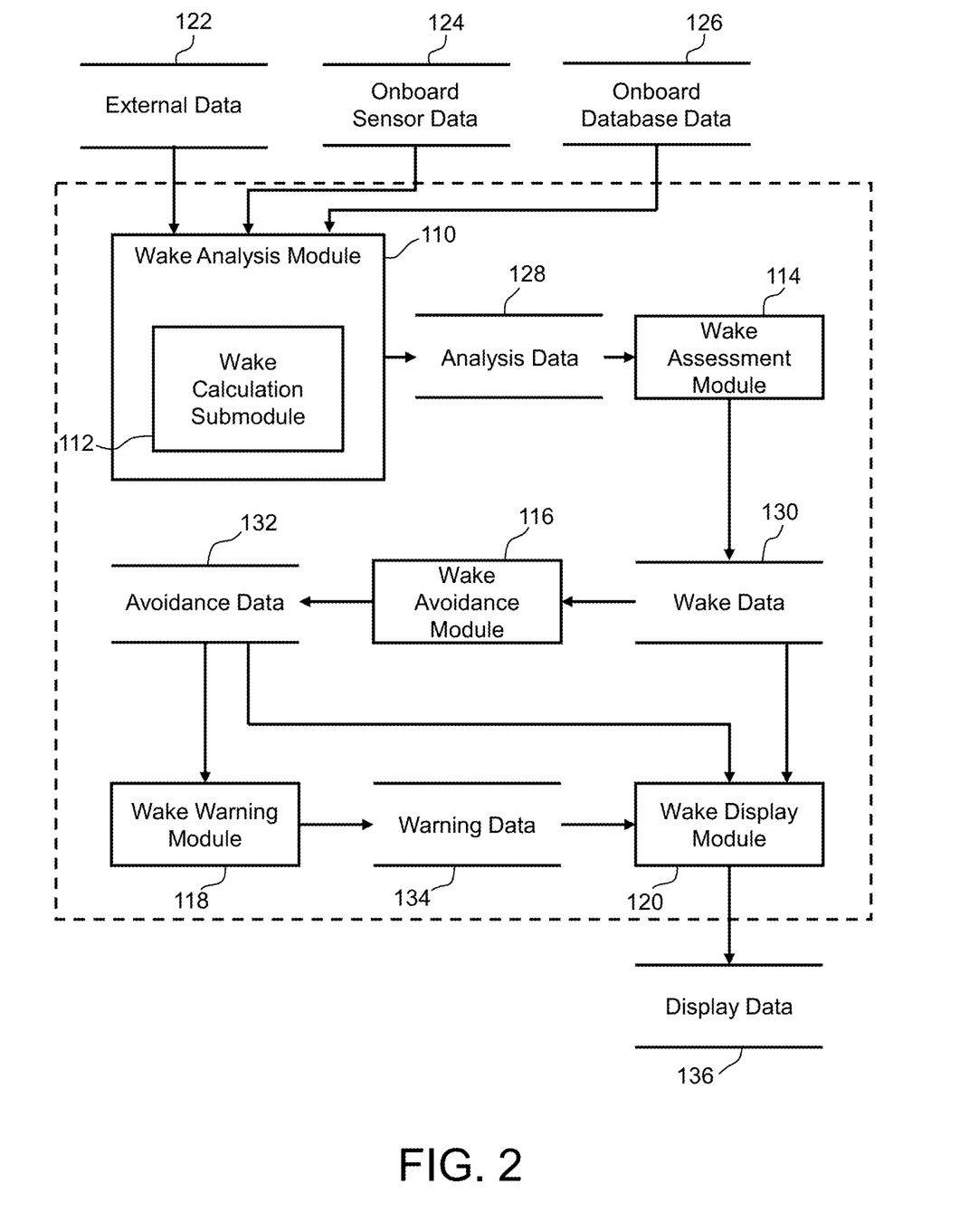
FIG. 2 is a data flow diagram illustrating data flow within the system of FIG. 1.

With reference to FIG. 2 and with continued reference to FIG. 1, a dataflow diagram illustrates elements of the system 10 of FIG. 1 in accordance with various embodiments. As can be appreciated, various embodiments of the system 10 according to the present disclosure may include any number of modules embedded within the controller 12 which may be combined and/or further partitioned to similarly implement systems and methods described herein. Furthermore, inputs to the system 10 may be received from other control modules (not shown) associated with the ownship, and/or determined/modeled by other sub-modules (not shown)

within the controller 12. In various embodiments, the system 10 includes a wake analysis module 110, a wake calculation submodule 112, a wake assessment module 114, a wake avoidance module 116, a wake warning module 118, and a wake display module 120.

In various embodiments, the wake analysis module 110 receives as input external data 122 received from the external sources 40 via the communication system 24, onboard sensor data 124 generated by the sensors 22, and/or onboard database data 126 retrieved from the database 28. The external data 122 includes various data indicating generating aircraft that departed/landed prior to the ownship on one or more runways of an airport such as, for example, specific aircraft, aircraft specifications, and/or aircraft size categories. Optionally, the external data 122 may include information relating to locations and/or intensities of wake turbulence generated by the generating aircraft. The external data 122 may include, but are not limited to, Automatic Dependent Surveillance-Broadcast (ADS-B) data, Traffic Collision Avoidance System (TCAS) data, Traffic Information Service—Broadcast (TISB) data, and satellite communications (SATCOM) data. The external data 122 may include directly measured wake turbulence data obtained via LIDAR or another type of device separate from the ownship (e.g., at the airport with measurement data transmitted through a datalink to the ownship). The onboard sensor data 124 includes various data indicating operating parameters of the ownship and/or environmental conditions (e.g., wind speed and/or direction; e.g., Automatic Terminal Information Service (ATIS) data or Air Data Computer (ADC) data) in a geographic area relevant to the ownship (e.g., adjacent to, along a flight path thereof, etc.). In various embodiments, the onboard sensor data 124 may include directly measured wake turbulence data obtained via LIDAR or another type of device onboard the ownship. The onboard database data 126 includes various data indicating airport runway map data. Optionally, the onboard database data 126 may include various data that may be used to reference and/or calculate wake turbulence(s) of the generating aircraft indicated in the external data 122 such as aircraft specifications, aircraft size categories, and/or authoritative regulations (e.g., standards adopted by the International Civil Aviation Organization (ICAO) or the Federal Aviation Administration (FFA)).

If the external data 122 includes the wake locations and/or intensities of the generating aircraft, the wake analysis module 110 may forward such information on to one or more of the other modules 114, 116, 118, and 120. Otherwise, the wake analysis module 110 may use the wake calculation submodule 112 to determine the location and intensity of wake turbulence(s) of the generating aircraft indicated in the external data 122 using information provided in the external data 122, the onboard sensor data 124, and/or the onboard database data 126. In some embodiments, the wake turbulence(s) may be calculated based on specifications of the generating aircraft, environmental conditions, touchdown or takeoff positions of the generating aircraft, a passage of time, etc. In some embodiments, the wake turbulence(s) may be approximate wake turbulence(s), for example, referenced from lookup tables stored in the database 28. In either of these embodiments, the information necessary to complete such calculations or references may be included in the external data 122, the onboard sensor data 124, and/or the onboard database data 126. In addition, the wake analysis module 110 may determines changes to the wake turbulence(s) over time. Such changes may be attributed, for example, to a passage of time (e.g., wake turbulence intensity decreases as a function of time) and/or changes in environmental conditions (e.g., an increase or decrease in wind speed, change in wind direction, etc.).

In various embodiments, the wake assessment module 114 receives as input analysis data 128 generated by the wake analysis module 110. The analysis data 128 includes various data indicating the location and current intensity of wake turbulence(s) of generating aircraft indicated in the external data 122.

The wake assessment module 114 determines which, if any, of the wake turbulence(s) pose a threat to the ownship. For example, a wake turbulence may be determined to be a threat if the wake turbulence is located over a runway to be used by the ownship during takeoff or landing thereof, and such wake turbulence has an intensity that is above a predetermined safety threshold of the ownship. In some embodiments, more than one wake turbulence may be determined to be a threat to the ownship. In such embodiments, the wake assessment module 114 may identify more than one wake turbulence as threats, or may identify only one of the more than one wake turbulences as a threat to the ownship (e.g., a greatest intensity and/or closest positioned of the wake turbulence).

In various embodiments, the wake avoidance module 116 receives as input wake data 130 generated by the wake assessment module 114. The wake data 130 includes various data indicating a current location, intensity, and estimated duration of the wake turbulence(s) of the generating aircraft that were determined to be a threat to the ownship by the wake assessment module 114.

The wake avoidance module 116 determines conditions necessary to avoid a wake turbulence encounter in which the ownship is impacted by the wake turbulence identified in the wake data 130. In various embodiments, the conditions may include a maximum speed, speed constraint (e.g., maximum speed minus a factor of safety), or target speed of the ownship that may be achieved during takeoff or landing maneuvers without being impacted by the wake turbulence in a manner than is a threat to the ownship. In various embodiments, the conditions may include or represent a distance between the ownship and the wake turbulence.

In various embodiments, the wake warning module 118 receives as input wake avoidance data 132 generated by the wake avoidance module 116. The wake avoidance data 132 includes various data indicating the conditions determined to be necessary to avoid a wake turbulence encounter by the ownship with the identified wake turbulence(s).

The wake warning module 118 performs a comparison of the conditions indicated in the wake avoidance data 132 and current operating conditions of the ownship, for example, the position, direction, and speed of the ownship, to determine whether the ownship will be impacted by the wake turbulence. In various embodiments, the wake warning module 118 may continuously determine a current distance between the ownship and the wake turbulence, and compare the determined distance to a predetermined safe separation distance. Upon a determination that the ownship will be impacted by the wake turbulence, the wake warning module 118 may generate and/or initiate generation of a warning. For example, the wake warning module 118 may generate wake warning data 134 configured to cause the warning to be rendered on the display device 32. The warning may include audible and/or visual indications of the warning.

In various embodiments, the wake display module 120 receives as input the wake data 130 generated by the wake assessment module 114, the wake avoidance data 132 generated by the wake avoidance module 116, and/or the wake warning data 134 generated by the wake warning module 118.

The wake display module 120 generates display data 136 configured to be received by the display device 32 to render one or more visual elements on the avionics display 34 that represent at least the location of the wake turbulence in relation to a takeoff or landing environment of the ownship. In some embodiments, the visual elements may include additional information such as, but not limited to, the intensity of the wake turbulence, the conditions necessary to avoid a wake turbulence encounter, etc.

Figure 3:
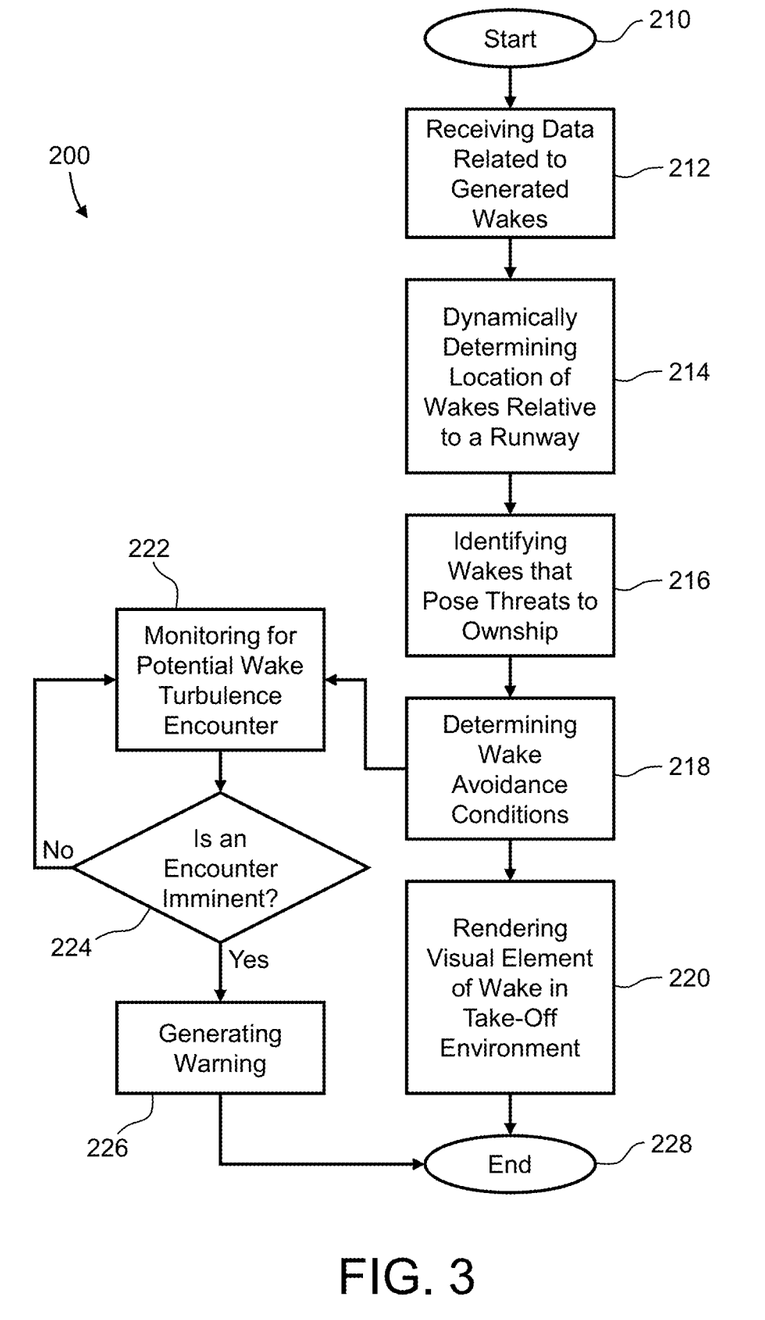
FIG. 3 is a flowchart of a method for wake turbulence notification in an aircraft system in accordance with various embodiments.

With reference now to FIG. 3 and with continued reference to FIGS. 1-2, a flowchart provides a method 200 for displaying wake turbulence information as performed by the system 10, in accordance with exemplary embodiments. As can be appreciated in light of the disclosure, the order of operation within the method 200 is not limited to the sequential execution as illustrated in FIG. 3, but may be performed in one or more varying orders as applicable and in accordance with the present disclosure. In various embodiments, the method 200 can be scheduled to run based on one or more predetermined events (e.g., during departure/landing conditions), and/or can run continuously during operation of the ownship.

In one example, the method 200 may start at 210. The method 200 may include receiving data at 212 that includes information relating to wake turbulence(s) generated by other aircraft. At 214, the location and, optionally, the intensity of one or more wake turbulences of the other aircraft may be continuously or dynamically determined in real time. At 216, the method 200 may include identifying at least one of the one or more wake turbulences that pose a threat to the ownship during the takeoff or landing maneuver. Optionally, the method 200 may include determining wake avoidance conditions at 218. At 220, the method 200 may include rendering a visual element on a display device of the ownship. The visual element is configured to display information relating the determined location on the runway of the wake turbulence determined to be a threat to the ownship. The information may be displayed in relation to a takeoff or landing environment of the ownship. Optionally, the method 200 may include monitoring for potential wake turbulence encounters at 222. In some embodiments, the monitoring includes comparing the avoidance conditions to operating parameters of the ownship. If a determination is made at 224 that an impact between the ownship and the wake turbulence is imminent, a warning may be generated at 226. Otherwise, the method 200 may include continuing to monitor for potential wake turbulence encounters. The method 200 may end at 228.

Figure 4:
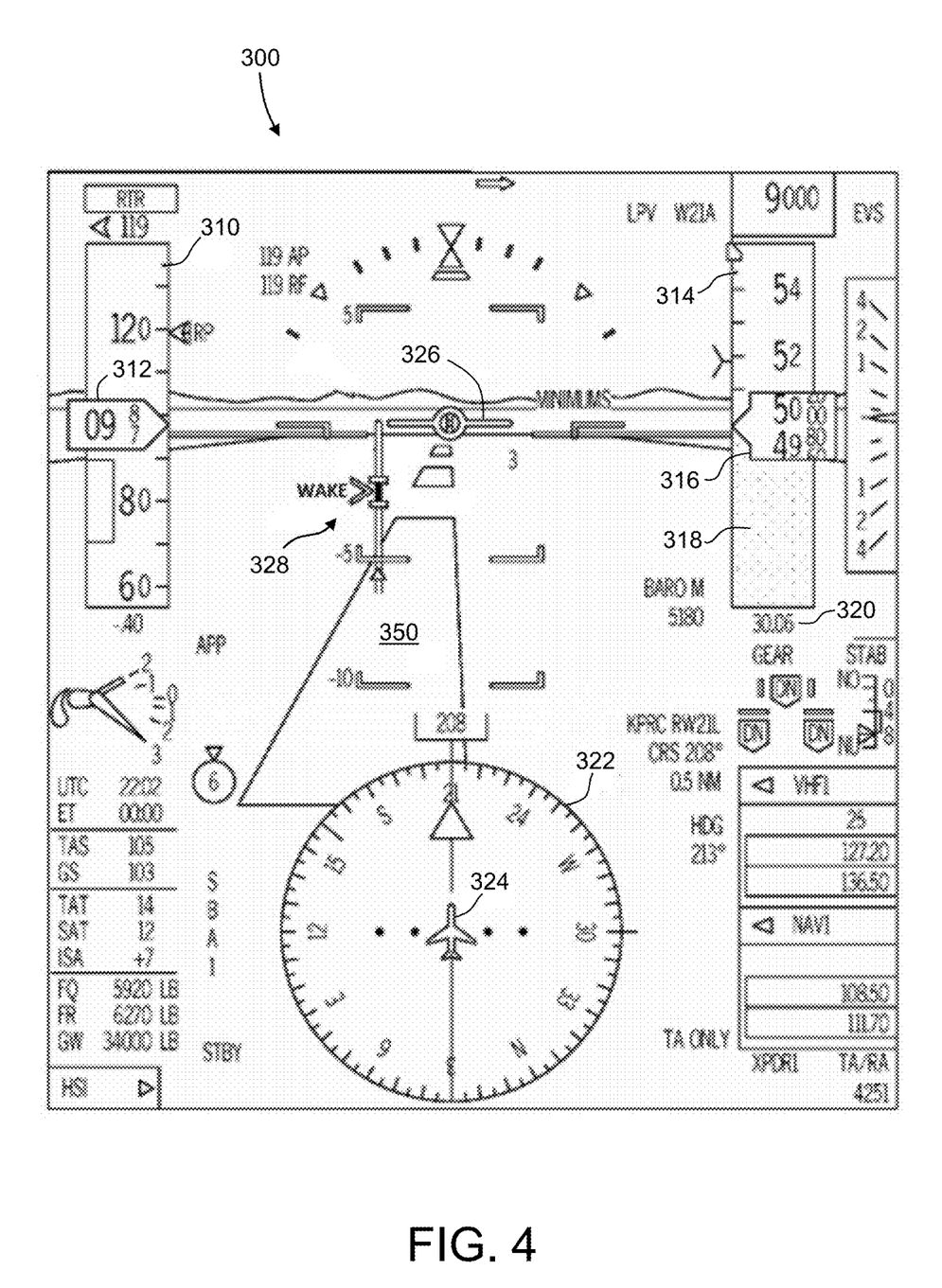
FIG. 4 is a first exemplary primary flight display that includes a visual element representing wake turbulence relative to a runway in accordance with various embodiments.
Figure 5:
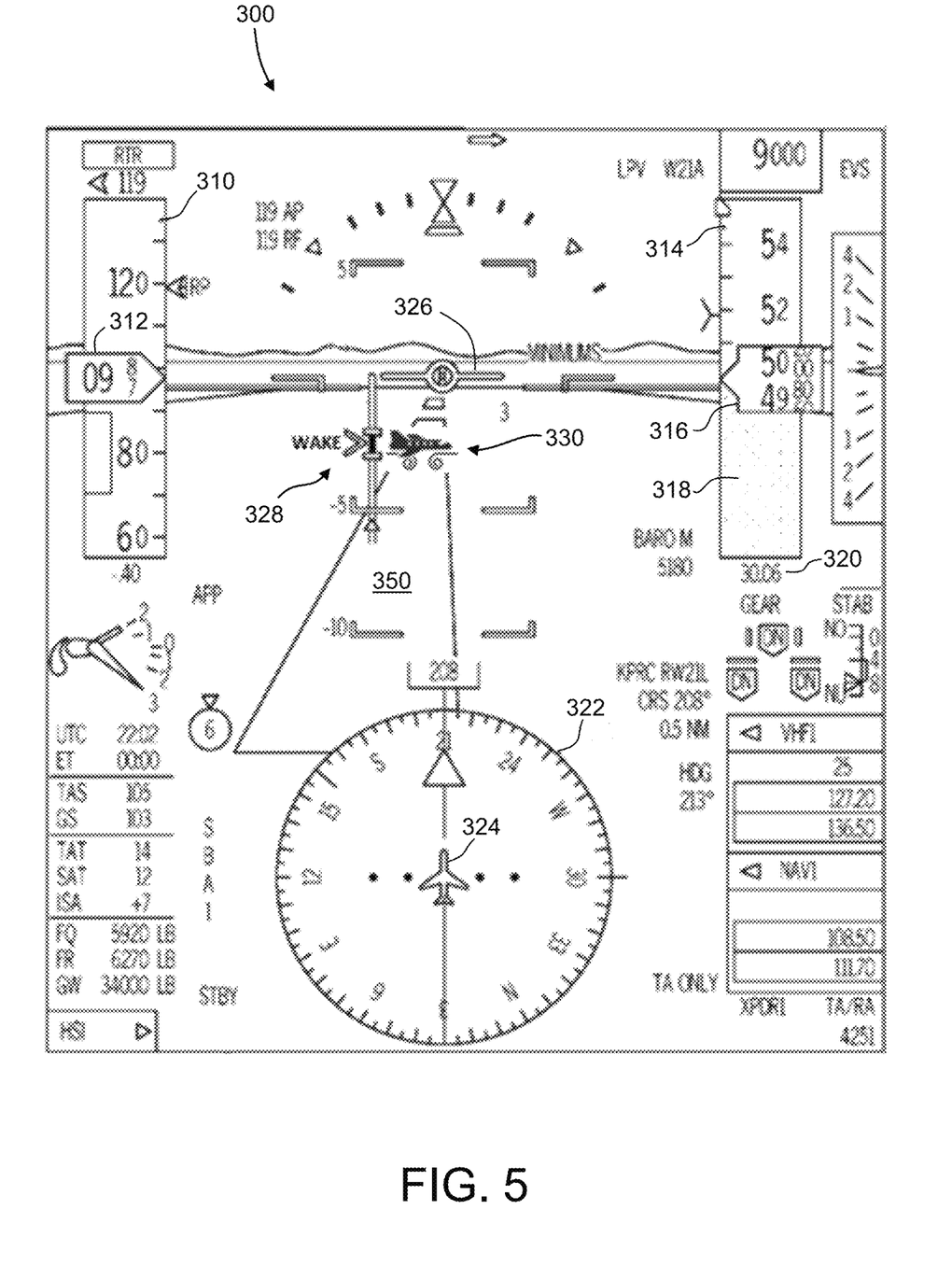
FIG. 5 is the primary flight display of FIG. 4 with a wake turbulence warning displayed thereon.
Figure 6:
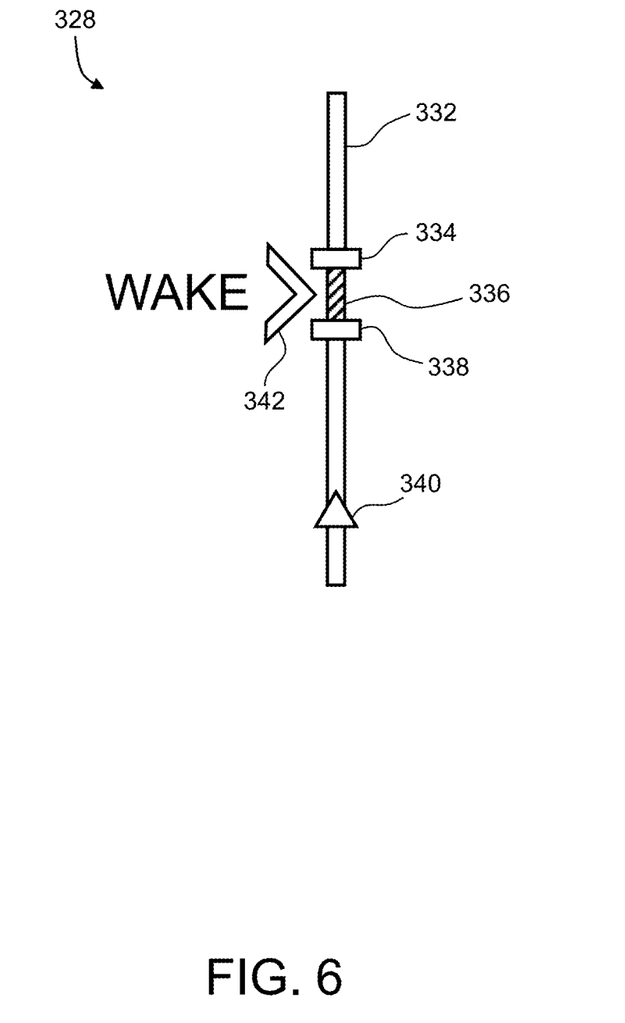
FIG. 6 is an isolated view of the visual element of FIGS. 4 and 5.

FIGS. 4-6 illustrate various nonlimiting examples of avionic displays 34. It should be noted that these examples are merely for illustrative purposes and the avionic displays 34 of the wake turbulence system 10 of FIG. 1 may have other configurations, including various combinations of the graphical elements represented in FIGS. 4-6.

FIG. 4 represents a first exemplary avionic display 34 referred to herein as a first primary flight display (PFD) 300 generated on the display device 32 of the display system 14. The first PFD 300 includes various graphical elements including, but not limited to, a compass 322 centered about an ownship icon 324; an airspeed indicator or "airspeed tape" 310, which features a precision readout window 312; an altitude indicator or "altitude tape" 314, which features a precision readout window 316 and a ground filled region 318; a barometric pressure setting readout 320 (located beneath the altitude tape 314); and a flight path vector graphic or flight path marker (FPM) 326, which moves across the first PFD 300 to reflect changes in the flight path of the ownship.

The first PFD 300 is a perspective view Synthetic Vision System (SYS) display including graphical renderings of terrain and other geographical features representing the view from the cockpit under ideal visibility conditions (a so-called "glass cockpit" view). The simulated "glass cockpit" view produced on the first PFD 300 thus includes a runway graphic 350, which represents a first-person view of a real world runway along which the ownship is presently traveling or approaching. Additionally, the first PFD 300 includes a dynamic visual element 328 representative of a location of a wake turbulence that poses a threat to the ownship. The visual element 328, also referred to herein as the wake turbulence (WT) icon 328, may be rendered on the first PFD 300 at a suitable time pending aircraft takeoff or landing.

In the exemplary embodiment shown in FIGS. 4-6, the WT icon 328 includes a runway symbol 332, an ownship symbol 340, a wake symbol 342, a first position symbol 334 on the runway, a second position symbol 338 along the runway, and an area 336 of the runway between the first and second position symbols 334 and 338. In this example, the runway symbol 332 is generated as a relatively long vertical line segment (i.e., a vertical bar), the ownship symbol 340 is generated as a relatively simple shape (e.g., a triangle) reminiscent of a planform aircraft shape and overlaid on runway symbol 332, the wake symbol 342 is generated as a V-shaped pointer or chevron, which is positioned adjacent to and appears to slide along the length of runway symbol 332. The length of runway symbol 332 may be varied based upon the length of the real world runway, which may be recalled from database 28, or may be fixed. In either case, wake symbol 342 is generated to be positioned along the runway symbol 332 at a location corresponding to a real world location of a wake turbulence on the runway utilized by the ownship. The ownship symbol 340 may first appear when the ownship contacts the runway surface (e.g., upon landing or upon entering from a taxiway). The controller 12 adjusts the position of the ownship symbol 340 on the runway symbol 332 to represent the actual position of the ownship along the runway. The controller 12 can determine the ownship position along the runway and when the ownship contacts the runway surface based upon information supplied by ownship database 28 and/or sensors 22. The first and second position symbols 334 and 338 are located along edges of the wake turbulence on the real world runway.

The particular position at which the WT icon 328 is generated on the first PFD 300 or another cockpit display may vary amongst embodiments. In one embodiment, the WT icon 328 is generated adjacent to the FPM 326 for visual prominence. Additionally, the WT icon 328 may be fixed with respect to the FPM 326 and, thus, move in conjunction therewith. Furthermore, in at least some embodiments, the fixed position of the WT icon 328 relative to the FPM 326 can be determined based upon whether the ownship is the process of takeoff from or landing at the runway depicted on the first PFD 300.

Figure 7:
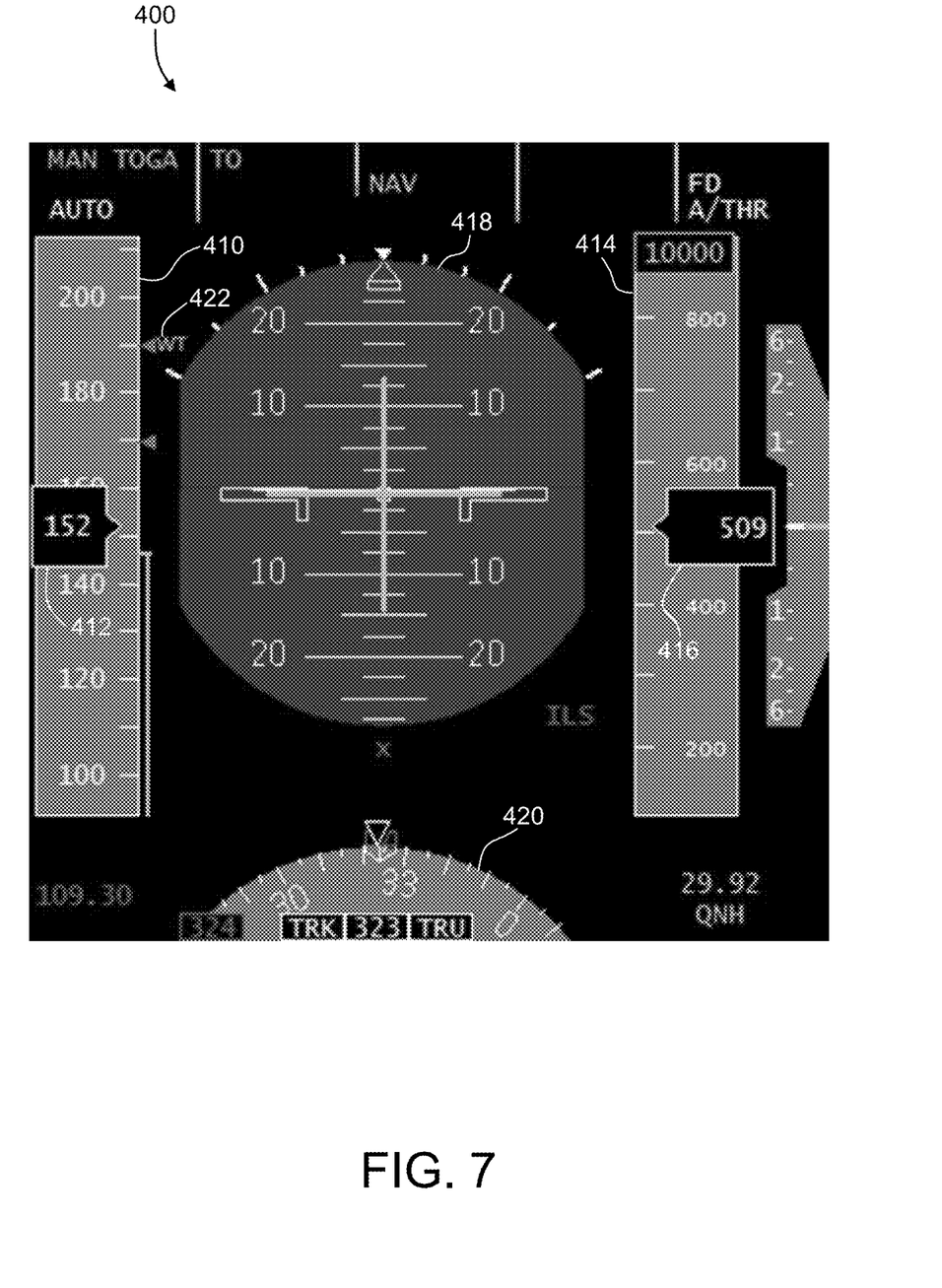
FIG. 7 is a second exemplary primary flight display that includes a visual element representing wake turbulence relative to a speed profile of the aircraft in accordance with various embodiments.

FIG. 7 represents a second exemplary avionic display 34 referred to herein as a second primary flight display (PFD) 400 generated on the display device 32 of the display system 14. The second PFD 400 includes various graphical elements including, but not limited to, an airspeed indicator 410, which features a precision readout window 412; an altimeter indicator 414, which features a precision readout window 416; an attitude indicator 418; and a horizontal situation indicator 420. In addition, the second PFD 400 includes a visual element 422, also referred to herein as the wake turbulence (WT) icon 422, that dynamically indicates a maximum speed at which the ownship may travel during a takeoff or landing maneuver to avoid a wake turbulence encounter that poses a threat to the ownship, or alternatively, a speed constraint (e.g., maximum speed minus a factor of safety), a target speed, or a target speed range. In this example, the WT icon 422 includes a solid, triangle shaped symbol with the letters "WT" (i.e., wake turbulence) adjacent thereto.

The WT icon 328 of FIGS. 4-6 and the WT icon 422 of FIG. 7 may be rendered on the first and second PFDs 300 and 400, respectively, at a suitable time pending ownship takeoff or landing. The particular point at which the WT icons 328, 422 initially appear will vary amongst embodiments, but may occur, in the case of departure, in conjunction with, for example, startup of the ownship or entry onto a runway and prior to takeoff. In the case of landing, the WT icons 328, 422 may appear after physical contact between the ownship and the runway or upon approach with the runway.

The controller 12 may update the WT icons 328, 422 continually or at least at a relatively rapid refresh rate. For example, the controller 12 may repeatedly adjust the positions of the ownship symbol 340, the first and second position symbols 334 and 338, and the area 336 therebetween relative to the other static graphics of the WT icon 328 and thereby provide a real time or near real time indication of the position of the ownship and the wake turbulence. As another example, the controller 12 may repeatedly adjust the position or value of the WT icon 422 relative to the airspeed indicator 410 and thereby provide a real time or near real time indication of the maximum speed, speed constraint, target speed, and/or target speed range of the ownship for avoidance of the wake turbulence.

A pilot can reference the WT icons 328, 422 to assist in decisions relating to acceleration/deceleration of the ownship on the runway, timing of using the runway, and other decisions relating to operation of the ownship and use of the runway. For example, the pilot may operate the ownship at a speed such that the ownship does not reach the indicated wake turbulence prior to adequate dissipation thereof, prior to landing of the ownship, or prior to lift-off of the ownship. As another example, the pilot may temporarily delay initiating takeoff or landing maneuvers of the ownship to allow the wake turbulence to dissipate at least partially. As yet another example, the pilot may operate the ownship at a speed such that the ownship does not exceed a maximum speed, speed constraint, target speed, or target speed range determined safe and therefore does not reach the indicated wake turbulence prior to adequate dissipation thereof.

In some embodiments, the appearance of the WT icons 328, 422 can be varied to generate visual alerts and convey other information useful in determining an optimal manner in which to avoid wake turbulence during takeoff or landing. For example, FIG. 5 represents the WT icon 328 as including an additional cautionary icon 330 that includes an aircraft symbol adjacent a wake turbulence symbol. Here, the controller 12 has altered the appearance of the WT icon 328 to generate a visual alert cautioning the pilot that the ownship may experience a wake turbulence encounter based on the current operating conditions of the ownship. This and other visual alerts can be implemented by changing the appearance of WT icons 328, 422 in any number of manners. Other examples may include increasing a size of one or more aspects of the WT icons 328, 422, changing a color of one or more aspects of the WT icons 328, 422, or any other modification intended to draw the attention of the pilot. In some embodiments, the appearance of the WT icons 328, 422 can be changed in other manners to generate alerts and the alerts can increase in urgency depending upon the severity of the alert condition. For example, in the case of a higher level alert, certain aspects can be rendered in a predetermined warning color (e.g., red) or animation (e.g., flashing) can be applied to one or more of aspects of the WT icons 328, 422.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:
   a display device that is onboard an aircraft;
   a controller in communication with the display device, the controller configured to, by a processor:
      receive data that includes information relating to a wake turbulence generated by one or more other aircrafts;
      determine a location on a runway of the wake turbulence based on the received data; and
      render one or more visual elements on the display device that are configured to display information relating the determined location on the runway of the wake turbulence, wherein at least some of the information is displayed in relation to a takeoff environment of the aircraft, wherein a first of the one or more visual elements is rendered in relation to a speed profile of the aircraft during a takeoff maneuver, and indicates a speed constraint of the aircraft that may be achieved during the takeoff maneuver without being impacted by the wake turbulence in a manner that is a threat to the aircraft.

2. The system of claim 1, wherein the controller is configured to, by the processor, render a visual representation of the runway on the display device, and render a second of the one or more visual elements in a manner that visually locates the determined location of the wake turbulence on the visual representation of the runway.

3. The system of claim 2, wherein the one or more visual elements include a bar representing the runway, a first icon on the bar that indicates the location of the wake turbulence on the runway, and a second icon on the bar that indicates a location of the aircraft on the runway.

4. The system of claim 1, wherein the controller is configured to, by the processor, dynamically update the one or more visual elements on the display device based on environmental conditions, passage of time, and operation of the aircraft.

5. The system of claim 1, wherein the controller is configured to, by the processor:
   determine whether the aircraft will be impacted by the wake turbulence based on operating conditions of the aircraft; and
   generate an alert in response to determining that the aircraft may be impacted by the wake turbulence based on the operating conditions of the aircraft.

6. The system of claim 5, wherein the alert includes a cautionary visual element rendered on the display device.

7. The system of claim 1, wherein the controller is configured to, by the processor:
   determine if the wake turbulence poses a threat to the aircraft during a takeoff maneuver; and
   modify the one or more visual elements upon a determination that the wake turbulence poses a threat to the aircraft.

8. A system comprising:
   a display device that is onboard an aircraft;
   a controller in communication with the display device, the controller configured to, by a processor:
      receive data that includes information relating to more than one wake turbulence generated by one or more other aircrafts;
      determine locations on a runway at which the aircraft is predicted to be impacted by the more than one wake turbulence during a takeoff maneuver based on the received data and operational parameters of the aircraft;
      determine which one of the more than one wake turbulence poses a greatest threat to the aircraft during the takeoff maneuver based on the determined locations and intensities of the more than one wake turbulences; and
      render a visual element on the display device that is configured to display information relating the determined location on the runway of the one wake turbulence, wherein the information is displayed in relation to a takeoff environment of the aircraft that poses the greatest threat to the aircraft.

9. A method comprising:
   receiving data, with a processor of a controller of an aircraft, that includes information relating to a wake turbulence generated by one or more other aircrafts;
   determining, with the processor, a location on a runway of the wake turbulence based on the received data; and
   rendering, with the processor, one or more visual elements on a display device that is onboard the aircraft that is in communication with the controller, wherein the one or more visual elements are configured to display information relating the determined location on the runway of the wake turbulence, wherein at least some of the information is displayed in relation to a takeoff environment of the aircraft, wherein a first of the one or more visual elements is rendered in relation to a speed profile of the aircraft during a takeoff maneuver, and that indicates a speed constraint of the aircraft that may be achieved during the takeoff maneuver without being impacted by the wake turbulence in a manner than is a threat to the aircraft.

10. The method of claim 9, further comprising, by the processor, rendering a visual representation of the runway on the display device, and rendering a second of the one or more visual elements in a manner that visually locates the determined location of the wake turbulence on the visual representation of the runway.

11. The method of claim 10, further comprising, by the processor, rendering the one or more visual elements to include a bar representing the runway, a first icon on the bar that indicates the location of the wake turbulence on the runway, and a second icon on the bar that indicates a location of the aircraft on the runway.

12. The method of claim 9, further comprising, by the processor, updating the one or more visual elements on the display device in real time based on environmental conditions, passage of time, and operation of the aircraft.

13. The method of claim 9, further comprising, by the processor:
   determining whether the aircraft will be impacted by the wake turbulence based on operating conditions of the aircraft; and
   generating an alert in response to determining that the aircraft may be impacted by the wake turbulence based on the operating conditions of the aircraft.

14. The method of claim 13, further comprising, by the processor, rendering the alert to include a cautionary visual element on the display device.

15. The method of claim 9, further comprising, by the processor:
   determining if the wake turbulence poses a threat to the aircraft during a takeoff maneuver; and
   modifying the one or more visual elements upon a determination that the wake turbulence poses a threat to the aircraft.

16. The method of claim 9, further comprising, by the processor:
   receiving data that includes information relating to more than one wake turbulence generated by the one or more other aircrafts;
   determining locations on the runway at which the aircraft is predicted to be impacted by the more than one wake turbulences during a takeoff maneuver based on the received data and operational parameters of the aircraft;
   determining which one of the more than one wake turbulence poses a greatest threat to the aircraft during the takeoff maneuver based on the determined locations and intensities of the more than one wake turbulences; and
   rendering the one or more visual elements on the display device, wherein the one or more visual elements are configured to display information relating to the determined location on the runway of the one wake turbulence that poses the greatest threat to the aircraft.

17. The system of claim 7, wherein the controller is configured to, by the processor, determine if the wake turbulence poses a threat to the aircraft during a takeoff maneuver based, at least in part, on the wake turbulence is located over a runway to be used by the aircraft during the takeoff maneuver and the wake turbulence has an intensity that is above a predetermined safety threshold of the aircraft.

18. The system of claim 8, wherein the controller is configured to, by the processor, render a visual representation of the runway on the display device, and render a second of the one or more visual elements in a manner that visually locates the determined location of the wake turbulence on the visual representation of the runway, wherein the controller is configured to, by the processor, dynamically update the one or more visual elements on the display device based on environmental conditions, passage of time, and operation of the aircraft.

19. The system of claim 1, wherein the controller is configured to, by the processor, render an airspeed tape on the display device, wherein the first of the one or more visual elements is rendered in relation to the airspeed tape.

20. The system of claim 8, further comprising rendering an airspeed tape on the display device, wherein the first of the one or more visual elements is rendered in relation to the airspeed tape.

* * * * *